(12) United States Patent
Nunez Polo et al.

(10) Patent No.: US 11,933,268 B2
(45) Date of Patent: Mar. 19, 2024

(54) METHOD AND DEVICE TO EXTEND THE LIFE CYCLE OF A WIND TURBINE

(71) Applicant: Nordex Energy Spain, S.A.U., Barasoain (ES)

(72) Inventors: Miguel Nunez Polo, Barasoain (ES); Teresa Arlaban Gabeiras, Barasoain (ES); Jose Miguel Garcia Sayes, Barasoain (ES); Francisco Fernandez Faraldo, Naron (ES); Vicente Pigueiras Martinez, Naron (ES); Jose Ramon Franco Caaveiro, Naron (ES)

(73) Assignee: NORDEX ENERGY SPAIN S.A.U., Barasoain (ES)

( * ) Notice: Subject to any disclaimer, the term of this patent is extended or adjusted under 35 U.S.C. 154(b) by 0 days.

(21) Appl. No.: 16/707,504

(22) Filed: Dec. 9, 2019

(65) Prior Publication Data

US 2020/0191124 A1 Jun. 18, 2020

(30) Foreign Application Priority Data

Dec. 18, 2018 (EP) ..................................... 18382940

(51) Int. Cl.
| | |
|---|---|
| *F03D 80/70* | (2016.01) |
| *F03D 7/02* | (2006.01) |
| *F03D 15/00* | (2016.01) |
| *F03D 80/50* | (2016.01) |

(52) U.S. Cl.
CPC ........... *F03D 15/00* (2016.05); *F03D 7/0204* (2013.01); *F03D 7/0244* (2013.01); *F03D 80/70* (2016.05); *F03D 80/50* (2016.05); *F05B 2230/80* (2013.01); *F05B 2240/916* (2013.01)

(58) Field of Classification Search
CPC ................................ F03D 80/50; F03D 80/70
See application file for complete search history.

(56) References Cited

U.S. PATENT DOCUMENTS

| | | | | |
|---|---|---|---|---|
| 8,371,030 | B2 * | 2/2013 | Shiraishi | F03D 80/50 29/889.1 |
| 8,459,946 | B2 * | 6/2013 | Yoshida | F03D 7/0204 416/17 |
| 9,022,739 | B2 * | 5/2015 | Krishnan | B66C 23/207 416/146 R |
| 9,689,174 | B2 | 6/2017 | Gotfredsen | |
| 2012/0192391 | A1 * | 8/2012 | Tobinaga | F03D 80/50 29/23.51 |

FOREIGN PATENT DOCUMENTS

| | | | |
|---|---|---|---|
| EP | 2253841 | A2 | 11/2010 |
| EP | 2388480 | A1 | 11/2011 |
| EP | 2461021 | A2 | 6/2012 |
| EP | 2775137 | A2 | 9/2014 |

* cited by examiner

Primary Examiner — Justin D Seabe
(74) Attorney, Agent, or Firm — Hayes Soloway PC

(57) ABSTRACT

A nacelle includes in turn a nacelle frame, and a yaw bearing having likewise/in turn at least a geared ring for providing a rotatable connection between the nacelle and the tower around a yaw axis. A method includes the steps of: a) disengaging the rotatable connection between the nacelle and the tower; b) lifting the nacelle from the tower by using lifting means, allowing the rotation of the geared ring; and c) rotating the geared ring around the yaw axis until the geared ring reaches a predetermined position with respect to the component to which the geared ring is connectable, either to the nacelle or the tower.

19 Claims, 7 Drawing Sheets

METHOD AND DEVICE TO EXTEND THE LIFE CYCLE OF A WIND TURBINE

CROSS-REFERENCE TO RELATED APPLICATIONS AND PRIORITY

This patent application claims priority from EP Patent Application No. 18382940.7 filed Dec. 18, 2018. This patent application is herein incorporated by reference in its entirety.

OBJECT OF THE INVENTION

The present invention relates to a device and a method for relocating the yaw bearing of wind turbine without lowering the nacelle of said wind turbine to the ground. The device and method allow extending the life cycle of the wind turbine.

BACKGROUND OF THE INVENTION

In the state of the art different solutions for relocating the yaw bearing of wind turbines are described. For example, in document EP2461021 a wind turbine whose yaw bearing can be replaced by using several jacks located between the upper part of the tower and to the lower part of the nacelle frame in a such way that there is enough space to remove the yaw bearing in a radial direction of the yaw bearing is described. The removal of the yaw bearing is performed by means of a suspension unit that is provided on the nacelle and that can move while suspending the yaw bearing.

In document EP2388480 a maintenance method comprising attaching hydraulic jacks to a pedestal which in turn is attached to the tower and lifting the nacelle with the jacks to detach the nacelle from the tower from the state in which the nacelle is rotatably connected to the tower is disclosed.

It is also known document U.S. Pat. No. 9,689,174 that discloses a wind turbine prepared and arranged for housing at least one lifting device for lifting the nacelle relative to the tower such that the sliding component can be removed. Furthermore, a method of lifting the nacelle relative to the tower is provided. Thus, the sliding component may be removed and and/or replaced.

DESCRIPTION OF THE INVENTION

Wind turbines comprise a yaw system disposed between the nacelle and the upper part of the tower with the purpose of aligning the rotor to the wind to maximize the energy captured from it.

The yaw system, generally comprises a bearing which in turn comprises two movable rings and at least a geared crown connected to one of the rings. The combination of one of the movable rings and the geared crown to which it is connected is referenced in the description and claims as geared ring.

In some circumstances, such as very severe wind speed conditions, some teeth of the geared crown withstand loads much higher than the ones they have been design for and, as a result, some teeth could be damaged while the rest remain in perfect condition.

In other cases, for instance, whether the "wind rose" associated to the wind farm is very directional, i.e., there is a dominant wind direction in terms of annual hours compared to the rest of directions, some teeth of the geared crown would be subjected to loads during more time.

Conventionally, when such a teeth of the yaw bearing become damaged for the aforementioned reasons and its replacement is required, a large crane is used to remove the nacelle and lower it to the ground, where works to replace/repair the yaw bearing are performed. However, in this case, the cost of the large crane, the cost of labor, the cost of preparing the ground in order to locate the crane as well as other costs related to the yaw bearing itself becomes very large.

The purpose of the proposed device and method is to relocate the teeth of the geared crown which have been damaged or are close to being damaged due to their useful life, in a position which does not correspond to the position where the gears act when the wind blows in the dominant wind direction, in order to extend the life cycle of the yaw bearing.

This is achieved by providing a rotation of the geared ring, i.e. providing a rotation of the yaw bearing ring having attached the geared crown respect to the yaw axis.

The yaw system comprises a bearing comprising in turn at least two rings (a first ring and a second ring) which rotate one around the other. One of the rings is connected to the nacelle frame whilst the other is connected to the tower. On the outer radial surface of the first ring, a geared crown is attached or machined.

The teeth of said geared crown mesh with the pinion of a gear motor that can be fixed either to the nacelle frame or to the tower. In this way, when the gear motor is operated, the turning motion of its axis rotates the nacelle frame and the orientation of the wind turbine occurs.

Depending on how the two rings of the yaw bearing are connected to the tower and/or the frame of the nacelle, several possible combinations are identified. In all the embodiments the first ring has the geared crown fixed to it.

In a first possible embodiment, the gear motors are attached to the nacelle frame and are placed outside the tower. The first ring is connected to the tower and the second ring is connected to the nacelle frame. In this case, when the wind turbine is in operation and the gear motors, attached to the nacelle frame, rotate, the second ring rotates around the first ring of the yaw bearing and turning of the nacelle occurs.

In a second possible embodiment, the first ring is connected to the nacelle frame, the second ring is connected to the tower and the gear motors are attached to the outside of the tower. In this case, when the wind turbine is in operation and the gear motors, attached to the tower, rotate, the first ring rotates around the second ring of the yaw bearing and turning of the nacelle happens.

In a third possible embodiment, the first ring is connected to the nacelle frame whilst the second ring is connected to the tower. In this case, when the wind turbine is in operation and the gear motors, attached to the inside of the tower, rotate, the first ring rotates around the second ring of the yaw bearing and turning of the nacelle occurs.

In a fourth possible embodiment, the first ring is connected to the tower whilst the second ring is connected to the nacelle frame. In this case, when the wind turbine is in operation and the gear motors, attached to the nacelle frame and placed towards the tower (not outside the tower as in the first embodiment), rotate, the first ring rotates around the second ring of the yaw bearing and turning of the nacelle happens.

Once the different possibilities of connection between the elements of the yaw system and the tower and the nacelle frame are known, it is essential to provide a relative rotation of the first ring having attached the geared crown respect to the yaw axis and the element to which said first ring is connectable (tower or nacelle frame).

The steps of the method to relocate the most loaded teeth (or damaged teeth) of the yaw bearing geared crown in a different position are described:

a) disengaging a rotatable connection between the nacelle and the tower, b) lifting the nacelle (or the nacelle plus the yaw bearing) from the tower by using lifting means (auxiliary connection elements), that include a degree of freedom to vertically move the nacelle (or the nacelle plus the yaw bearing) with respect to the tower; and to prevent the nacelle from rotating around a yaw axis, c) rotating the first ring with the geared crown of the yaw bearing around the yaw axis and with respect to the component to which the first ring is connectable, either the nacelle or the tower, until a predetermined position is reached, g) lowering the nacelle (or the assembly formed by the nacelle and the yaw bearing) using the lifting means (auxiliary connection elements);

h) joining the first ring of the yaw bearing having the geared crown which has been moved by the gear motor to the element to which it was initially connected (the tower or the nacelle).

In step b) it is to be understood that when the geared ring (first ring+geared crown) is disengaged from the tower (in the case that the yaw bearing is lifted together with the nacelle), the yaw bearing will still be joined to the nacelle, as it was at the beginning. Consequently, when the nacelle is lifted, the yaw bearing is lifted together with it. In another embodiment, only the nacelle is lifted (without the yaw bearing) since the yaw bearing remains joined to the tower.

DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented:

In FIG. 6A the auxiliary connection element is placed outside the tower and in FIG. 6B the auxiliary connection element is placed inside the tower. In these figures, the first ring is depicted separated from the tower, since a gap is shown, indicated as an arrow, between the first ring and the tower.

—FIG. 7A shows an embodiment with four auxiliary connection elements distributed around the yaw bearing. FIG. 7B shows a zoom view of one of said auxiliary connection elements.

PREFERRED EMBODIMENT OF THE INVENTION

Figure 1A:
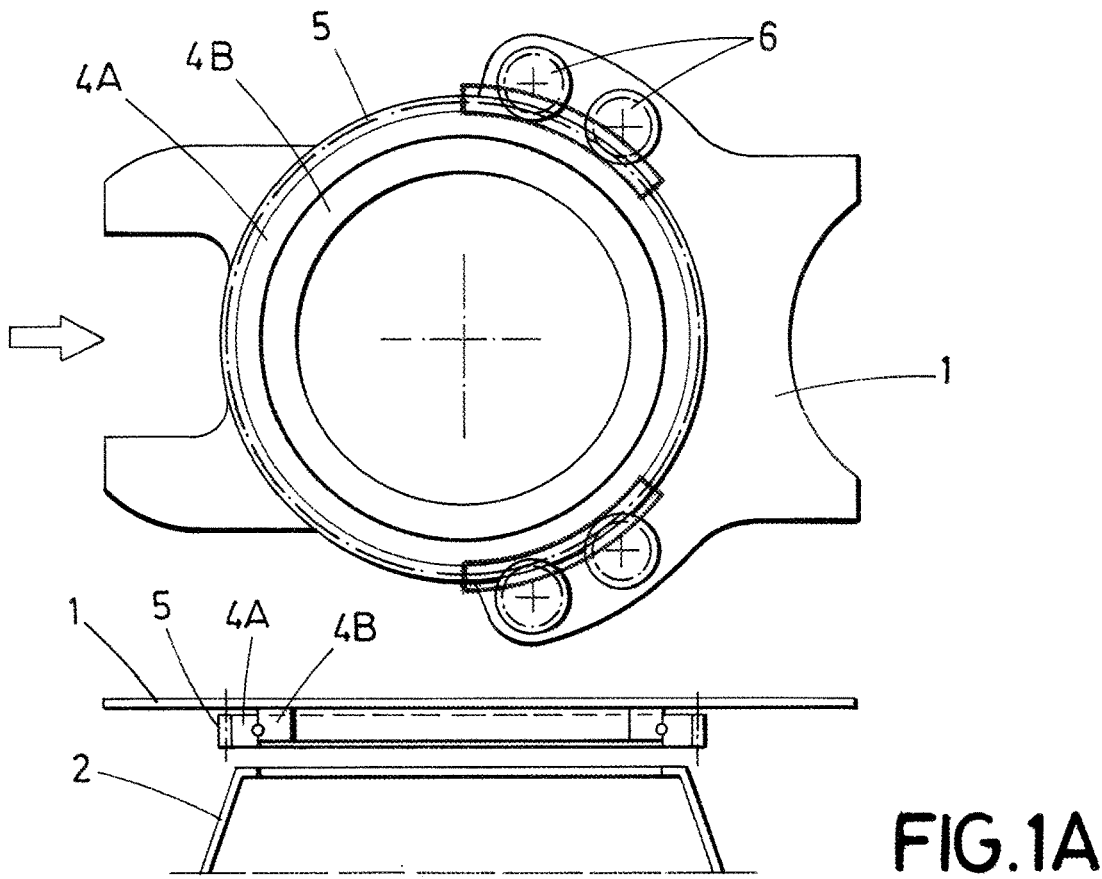
FIGS. 1A-B.—Show the most loaded teeth or damaged teeth of the geared ring in a position in which they are in contact with the gear motors (FIG. 1A) and in a position in which the geared ring has been rotated and less loaded teeth or non damaged teeth are in contact with the gear motors (FIG. 1B).

A description of some embodiments of the invention is done according to FIGS. 1 to 8.

The present invention consists of a method to extend the life cycle of a wind turbine comprising a tower (2), a nacelle comprising a nacelle frame (1), and a yaw bearing (3), comprising at least a geared ring, for providing a rotatable connection between the nacelle and the tower (2) around a yaw axis (11).

The yaw bearing (3) comprises the at least a geared ring which in turn comprises a first ring (4A) connected to a geared crown (5), and a second ring (4B). The two movable rings, first ring (4A) and second ring (4B), rotate one around the other and one of them is connected to the nacelle frame (1) and the other is connected to the tower (2). The geared crown (5) meshes with at least a pinion of a gear motor (6).

Figure 1B:
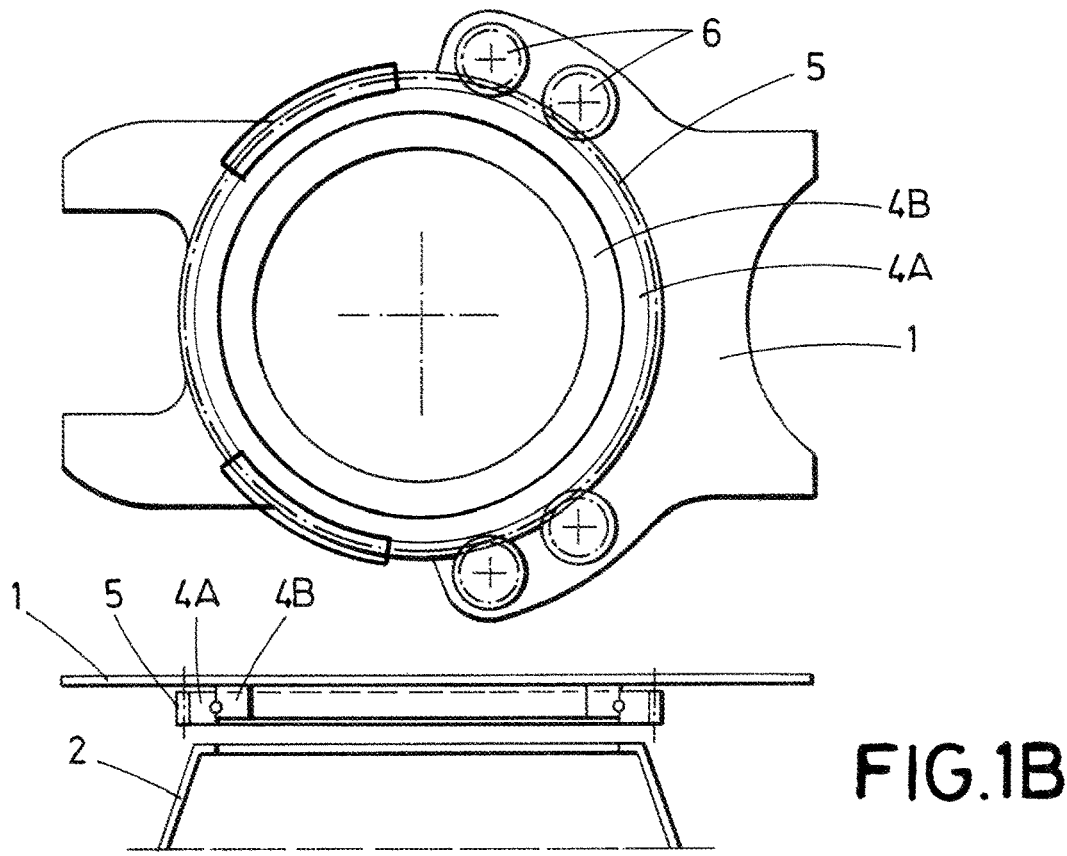

As previously described, under determined wind speed conditions, some teeth of the geared crown (5) could be over loaded or damaged while the rest remain in perfect conditions or much less damaged. This situation can be appreciated in FIG. 1A. In order to avoid teeth damaging or even restoration or replacement operations the present invention allows rotating the geared ring (first ring (4A) connected to the geared crown (5),) to place the not over-loaded teeth or not damaged teeth in contact with the gear motor (6), as shown in FIG. 1B.

In FIGS. 2 to 5 four possible embodiments of the assembly of the nacelle frame (1), the yaw bearing (3) and the tower (2) are shown.

Figure 2:
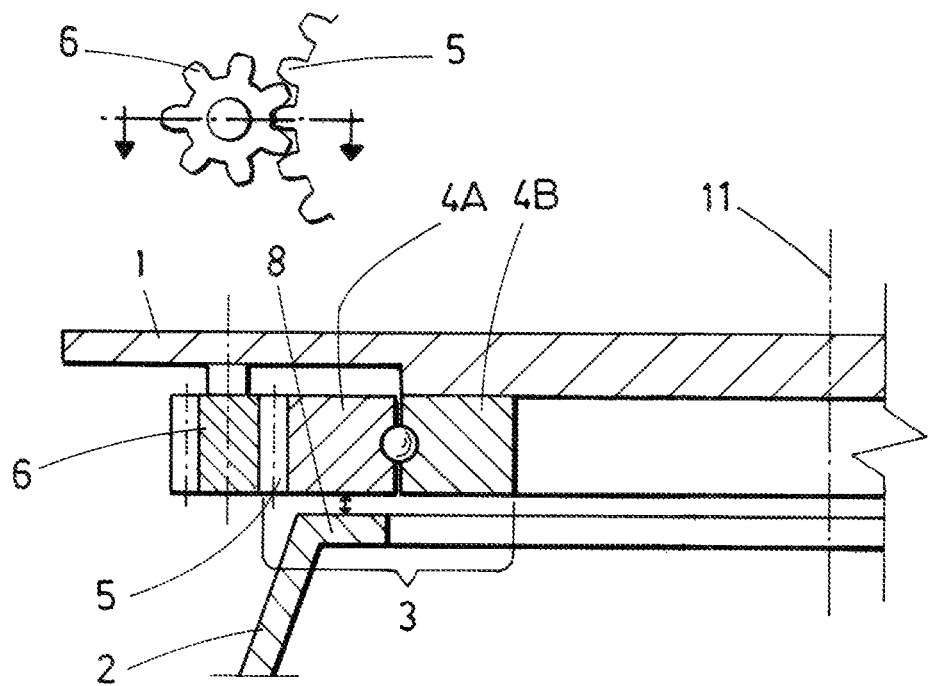
FIG. 2.—Shows a first embodiment in which the first ring of the yaw bearing has the geared crown and said first ring is connected to the tower. However, in the figure, the first ring is depicted separated from the tower since a gap is shown, indicated as an arrow, between the first ring and the tower. In this embodiment, the second ring is connected to the nacelle frame.

In the first possible embodiment, shown in FIG. 2, the first ring (4A) of the yaw bearing (3) has the geared crown (5) fixed to it and the gear motors (6) are attached to the nacelle frame (1), placed outside the tower. The first ring (4A) is connected to the tower (2) and the second ring (4B) is connected to the nacelle frame (1). In this case, when the wind turbine is in operation and the gear motors (6), attached to the nacelle frame (1), rotate, the second ring (4B) rotates around the first ring (4A) of the yaw bearing (3) and turning of the nacelle occurs.

In order to perform a relative rotation of the first ring (4A) of the yaw bearing (3) (the first ring (4A) having attached the geared crown (5)) with respect to the component to which it is connectable (the tower (2) in this case), the following steps are performed:

- disconnect the first ring (4A) from the tower (2);
- raising slightly the nacelle with the yaw bearing (3) attached to it by using lifting means that provide a vertical degree of freedom that allows to separate the yaw bearing (3) from the tower (2) until a gap (preferably less than 2 cm, indicated as an arrow) is created between the first ring (4A) with the geared crown (5) and the component to which it is connectable (the tower (2) in this case);
- rotate the first ring (4A) whilst the nacelle (2) remains steady (and thus the second ring (4B)); for example by means of the gear motors,
- lower the nacelle and the yaw bearing (3) by using the lifting means,
- connect the first ring (4A) to the tower (2).

Figure 3:
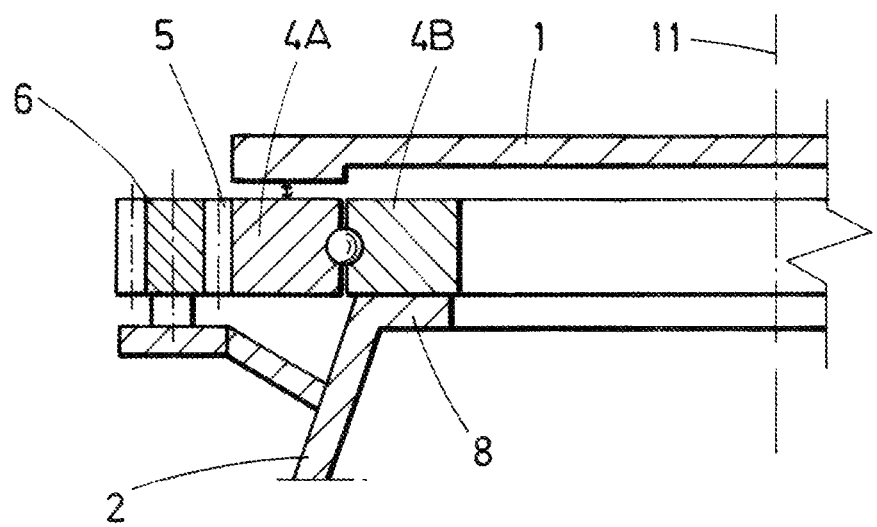
FIG. 3.—Shows a second embodiment in which the first ring is connected to the nacelle frame and has the geared crown fixed to it. The second ring is connected to the tower. In the figure, the first ring is depicted separated from the nacelle frame since a gap is shown, indicated as an arrow, between the first ring and the nacelle frame.

In a second possible embodiment, shown in FIG. 3, the first ring (4A) is connected to the nacelle frame (1) and has the geared crown (5) fixed to it, second ring (4B) is connected to the tower (2) and the gear motors (6) are attached to the outside of the tower (2). In this case, when the wind turbine is in operation and the gear motors (6), attached to the tower (2), rotate, first ring (4A) rotates around the second ring (4B) of the yaw bearing (3) and turning of the nacelle happens.

Again, to perform a relative rotation of the first ring (4A) (having attached the geared crown (5)), it is necessary to disconnect said first ring (4A) from the nacelle frame (1), raising the nacelle by using lifting means that provide a vertical degree of freedom that allows to separate the yaw bearing (3) from the nacelle until a gap (preferably less than 2 cm, indicated as an arrow) is created between the first ring (4A) with the geared crown (5) and the component to which it is connectable (nacelle). Next step is rotating the first ring (4A) with the geared crown (5), for example by means of the gear motors, whilst the second ring (4B) remains connected to the tower (2) and thus steady. Then the nacelle is lowered.

Figure 4:
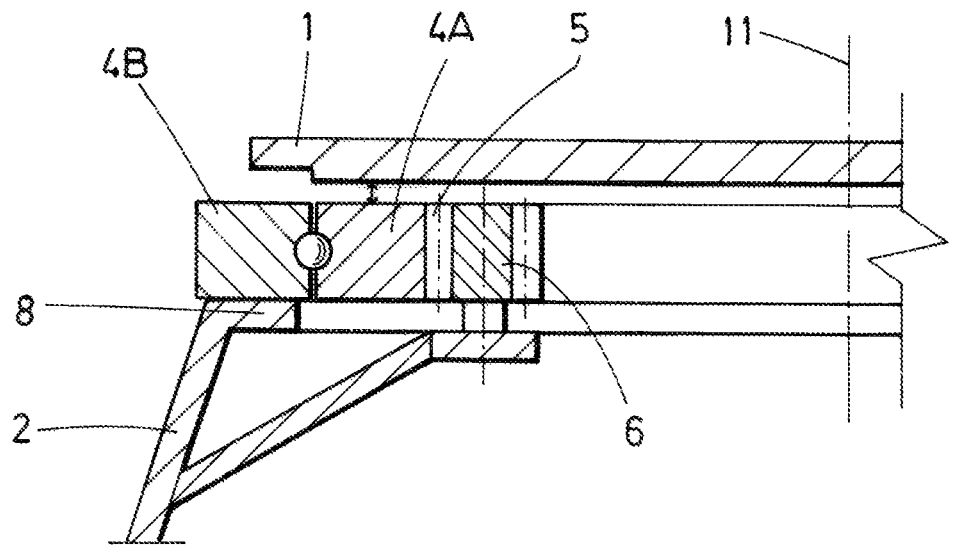
FIG. 4.—Shows a third embodiment in which the first ring is connected to the nacelle frame and has the geared crown fixed to it. The second ring is connected to the tower. In the figure, the first ring is depicted separated from the nacelle frame, since a gap is shown, indicated as an arrow, between the first ring and the nacelle frame.

In a third possible embodiment, shown in FIG. 4, the first ring (4A) of the yaw bearing (3) is connected to the nacelle frame (1) and has the geared crown (5) attached to it, while the second ring (4B) of the yaw bearing (3) and the gear motors (6) are connected to the tower (2). In this case, when the wind turbine is in operation and the gear motors (6), attached to the inside of the tower (2), rotate, the first ring (4A) rotates around the second ring (4B) of the yaw bearing (3) and turning of the nacelle happens.

Performing a relative rotation of the first ring (4A) of the yaw bearing (3) having attached the geared crown (5), involves disconnecting said first ring (4A) with the geared crown (5) from the nacelle, raising slightly the nacelle until a gap (preferably less than 2 cm, indicated as an arrow) is created between the first ring (4A) with the geared crown (5) and the component to which it is connectable (nacelle) and rotate the first ring (4A), for example by means of the gear motors, whilst the second ring (4B) remains steady. In this case, because the second ring (4B) of the yaw bearing (3) is connected to the tower (2), its immobilization is already guaranteed. Then the nacelle is lowered.

Figure 5:
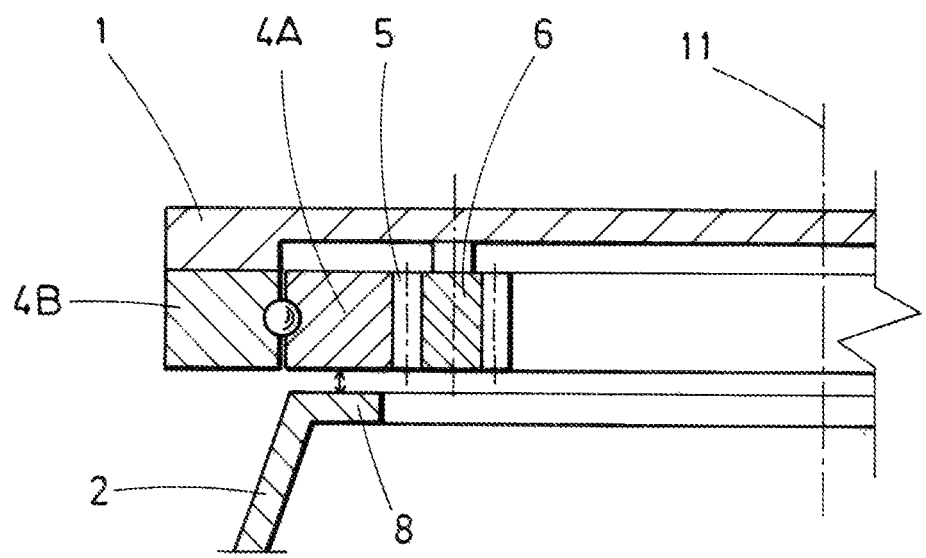
FIG. 5.—Shows a fourth embodiment in which the first ring of the yaw bearing has the geared crown and said first ring is connected to the tower. The second ring is connected to the nacelle frame. In the figure, the first ring is depicted separated from the tower, since a gap is shown, indicated as an arrow, between the first ring and the tower.

In a fourth possible embodiment, shown in FIG. 5, the first ring (4A) has the geared crown (5) fixed to it. The second ring (4B) of the yaw bearing (3) is connected to the nacelle frame (1) and the first ring (4A) to the tower (2). In this case, when the wind turbine is in operation and the gear motors (6), attached to the nacelle frame (1) and placed towards the tower (not outside the tower as in the first embodiment), rotate, the second ring (4B) rotates around the first ring (4A) of the yaw bearing (3) and turning of the nacelle happens.

In this embodiment, carrying out a relative rotation of the first ring (4A) of the yaw bearing (3) having attached the geared crown (5), involves to disconnect said first ring (4A) from the tower (2), raising slightly the frame of the nacelle with the yaw bearing (3) attached to it by using lifting means that provide a vertical degree of freedom that allows to separate the yaw bearing (3) from the tower (2) until a gap (preferably less than 2 cm, indicated as an arrow) is created between the first ring (4A) with the geared crown (5) and the component to which it is connectable (the tower (2) in this case); and rotate the first ring (4A), for example by means of the gear motors, whilst the nacelle (2) remains steady (and thus the second ring (4B)) Then the nacelle and the yaw bearing (3) are lowered by using the lifting means. Finally the first ring (4A) is connected to the tower (2).

It is also an object of the present invention a method to extend the life cycle of a wind turbine. A wind turbine in which the method is to be implemented comprises: a tower (2); a nacelle comprising a nacelle frame (1); a yaw bearing (3) and gear motors (6). The yaw bearing (3), comprising a geared crown (5), provides a rotatable connection between the nacelle and the tower (2) around a yaw axis (11).

The method comprises the following steps:

a) disengaging the rotatable connection between the nacelle and the tower (2), b) lifting the nacelle from the tower (2) by using lifting means, to allow the rotation of the geared ring with respect to the component to which the geared ring is connectable, c) rotating the geared ring around the yaw axis (11) until the geared ring reaches a predetermined position with respect to the component to which the geared ring is connectable, either to the nacelle or the tower (2).

Preferably, the method also includes a step of determining at least a sector of the geared ring with stands higher loads than the rest. The predetermined position of step c) includes, preferably, a position in which the over loaded sector of the geared ring will not be subjected to such high load level (for example a position in which the gear motors (6) engage outside the damaged sector of the geared ring).

In an embodiment of the invention, the yaw bearing (3) comprises:

the at least geared ring which in turn comprises a first ring (4A) connected to a geared crown (5), and a second ring (4B).

The step a) of disengaging the rotatable connection between the nacelle and the tower (2) comprises disengaging a connection selected between:

a connection between the first ring (4A) and the tower (2) while a connection between the second ring (4B) of the yaw bearing (3) and the nacelle is maintained or;

a connection between the first ring (4A) and the nacelle while a connection between the second ring (4B) of the yaw bearing (3) and the tower (2) is maintained.

The first ring (4A) being connected to the geared crown (5) means that the geared crown (5) can be an element joined to the first ring (4A) or can be machined in said first ring (4A).

Preferably, in this embodiment, step b) of the method is as follows:

b) lifting the nacelle from the tower (2) by using lifting means, allowing the rotation of the first ring (4A) with the geared crown (5) of the yaw bearing (3).

Also in this embodiment, preferably step c) is as follows:

c) rotating the first ring (4A) with the geared crown (5) of the yaw bearing (3) with respect to the yaw axis (11) and the component to which the first ring (4A) is connectable, either the nacelle or the tower (2), for example by means of the gear motors, until a predetermined position is reached.

The lifting means used in step b) which displace vertically the nacelle from the tower comprise limiters to limit said vertical displacement. In a preferred embodiment of the invention, the step of lifting the nacelle from the tower (2) is carried out by at least an auxiliary connection element (7) placed between the nacelle and the tower (2).

Figure 6A:
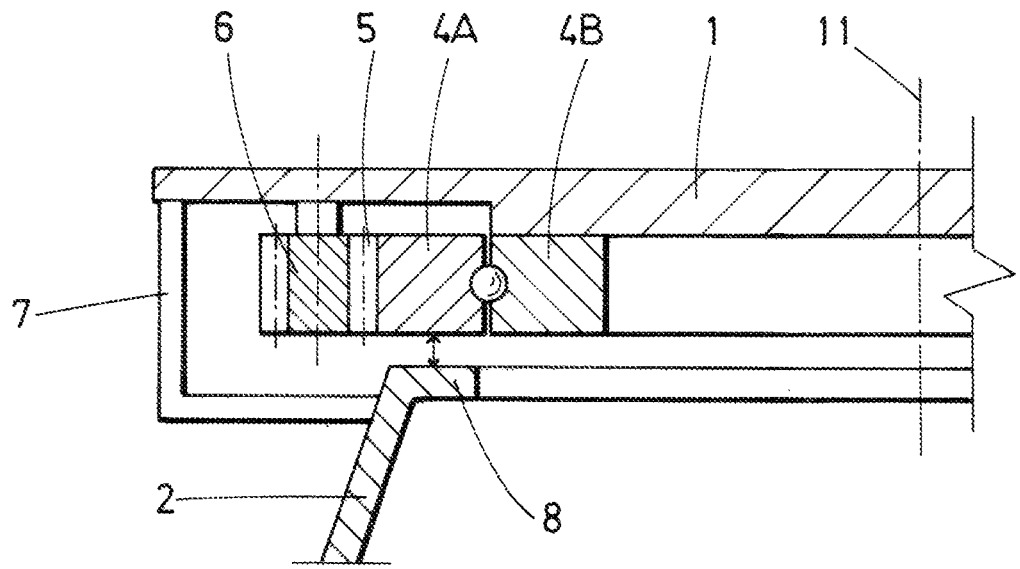
FIGS. 6A-B. Show embodiments with an auxiliary connection element connected to the tower and to the nacelle.
Figure 6B:
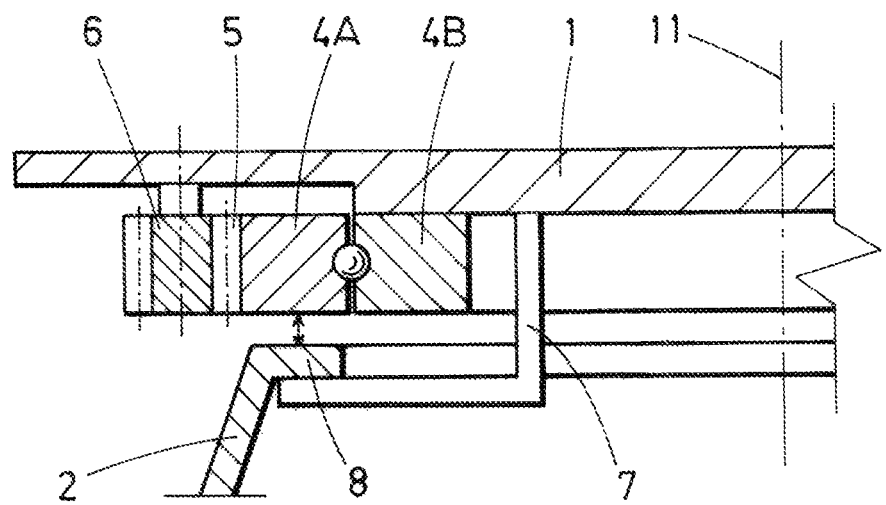

Said at least one auxiliary connection element (7) includes a degree of freedom to allow vertical movements of the nacelle with respect to the tower (2) and prevents the nacelle from rotating around a yaw axis (11). The auxiliary connection elements (7) are, preferably at least two and preferably are at least four. In FIG. 6A it is shown an embodiment in which the at least one auxiliary connection element (7) connected to the tower and to the nacelle is placed outside the tower. In FIG. 6B it is shown an embodiment in which the at least one auxiliary connection element (7) connected to the tower and to the nacelle is placed inside the tower.

The step of lifting the nacelle from the tower (2) comprises leaving a gap between the first ring (4A) which is fixed to the geared crown (5) and the nacelle or between the first ring (4A) fixed to the geared crown (5) and the tower (2). The gap can be of just a few centimeters. And the method further comprises a step of lowering the nacelle by using the lifting means and connecting the nacelle to the tower (2) through the yaw bearing (3).

The step of disengaging the rotatable connection between the nacelle and the tower (2) comprises disengaging a connection selected between the connection between the first ring (4A) with the geared crown (5) and the tower (2) while the connection between the second ring (4B) of the yaw bearing (3) and the nacelle is maintained (hence, when lifting the nacelle, the yaw bearing (3) is lifted with it and a gap is created between the first ring (4A) with the geared crown (5) and the tower (2) that is in this case the component to which the first ring (4A) with the geared crown (5) is connectable; or the connection between the first ring (4A) with the geared crown (5) and the nacelle while the connection between the second ring (4B) of the yaw bearing (3) and the tower (2) is maintained.

In the proposed method, the step of rotating the geared ring of the yaw bearing (3) is done by means of activating at least one gear motor (6) of a yaw drive. Said at least one gear motor (6) of the yaw drive can be fixed to the nacelle or to the tower (2).

Figure 7A:
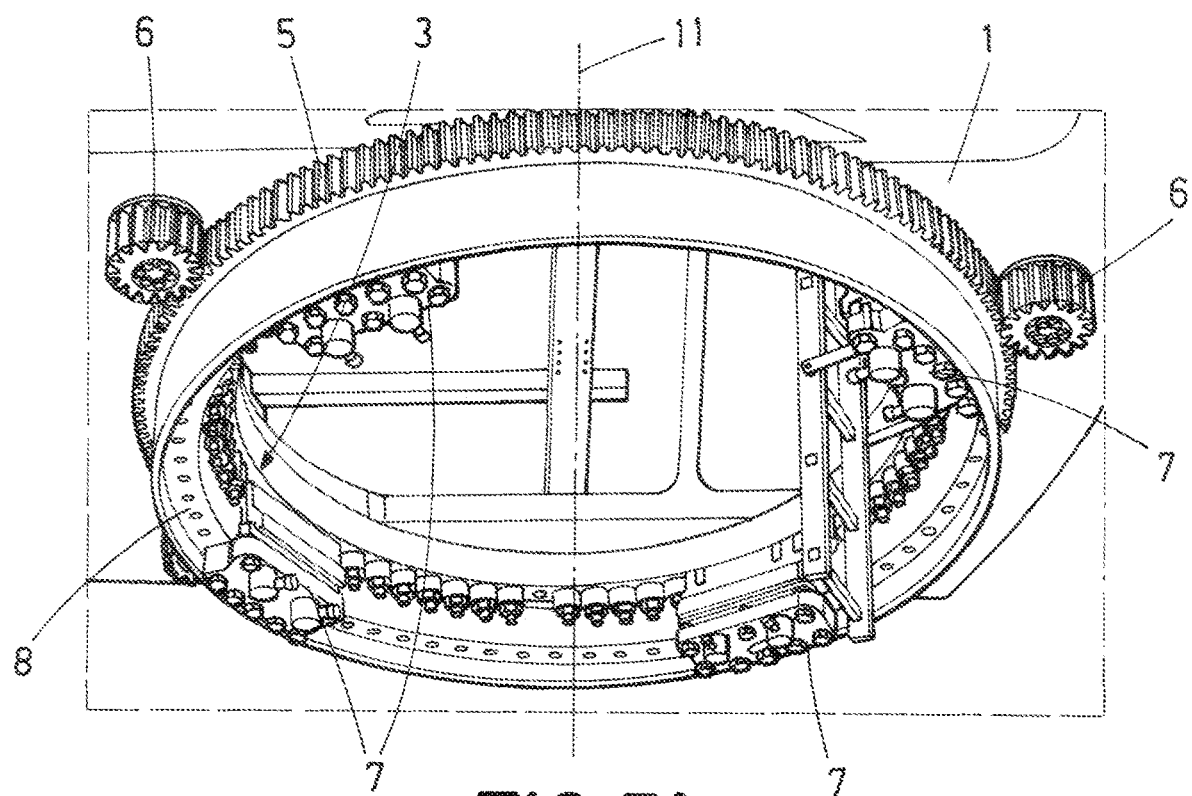
FIGS. 7A-B.
Figure 7B:
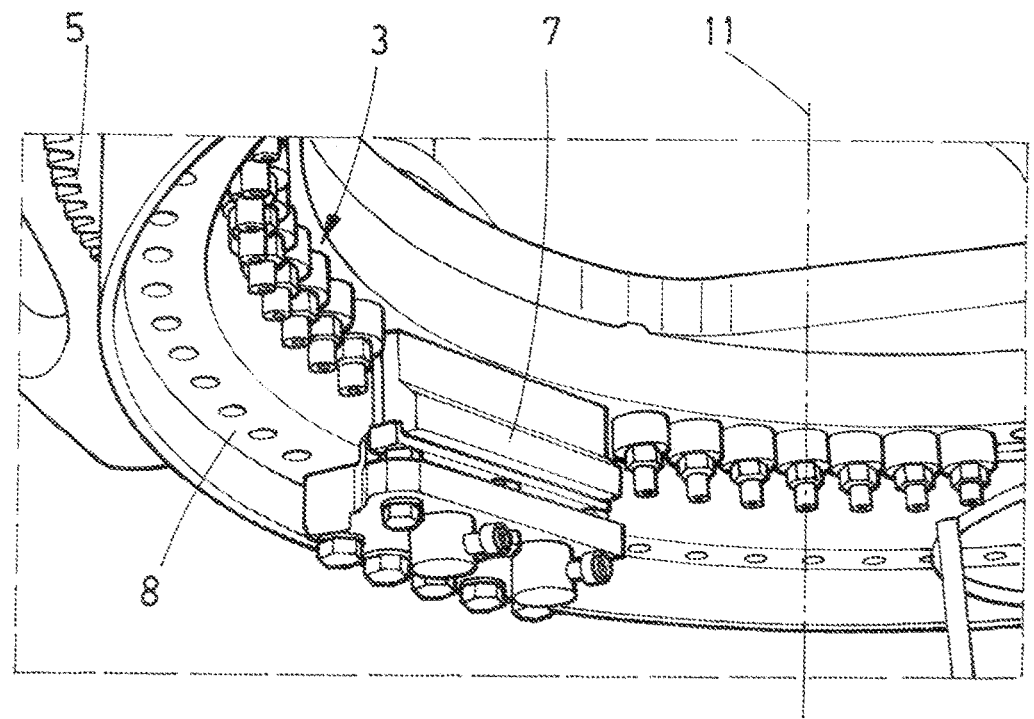

As shown in FIG. 7B, the auxiliary connection elements (7) comprise jacks.

In an embodiment of the invention, the auxiliary connection elements (7) are installed in the tower (2). Preferably, the auxiliary connection elements (7) comprise a first section to be connected to a flange (8) formed on the top end portion of the tower (2), and a second section to be connected to the nacelle.

In another embodiment of the invention, the auxiliary connection elements (7) comprise a first section to be connected to a flange (8) formed on the top end portion of the tower (2), and a second section to be connected to the yaw bearing (3). In this case, the auxiliary connection elements (7) allow lifting the nacelle by pushing the yaw bearing (3). This case can be used only in the first and fourth embodiments previously described. The second section of the at least one auxiliary connection element (7) can be connected to the yaw bearing (3) or only to be configured in order to the yaw bearing (3) to remain lay on said second section.

Figure 8A:
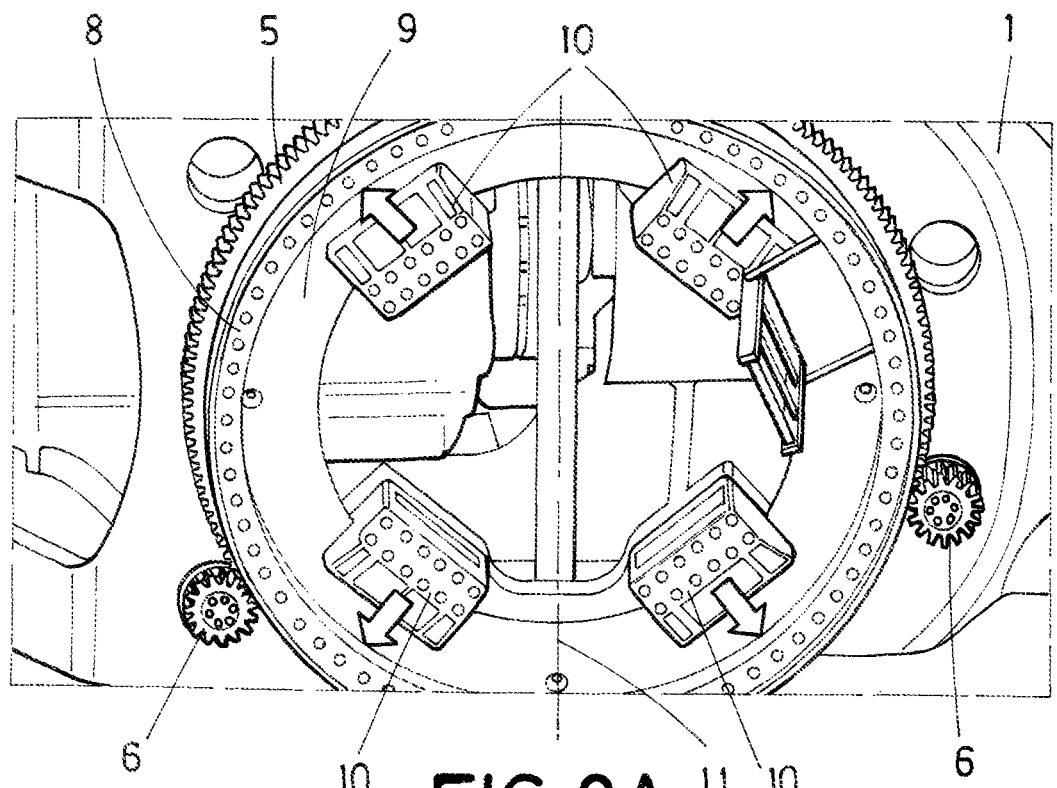
FIGS. 8A-B-C.—Show different views of another embodiment wherein the wind turbine comprises a breaking system wherein a brake disc is provided with four brake calipers distributed around the brake disc.
Figure 8B:
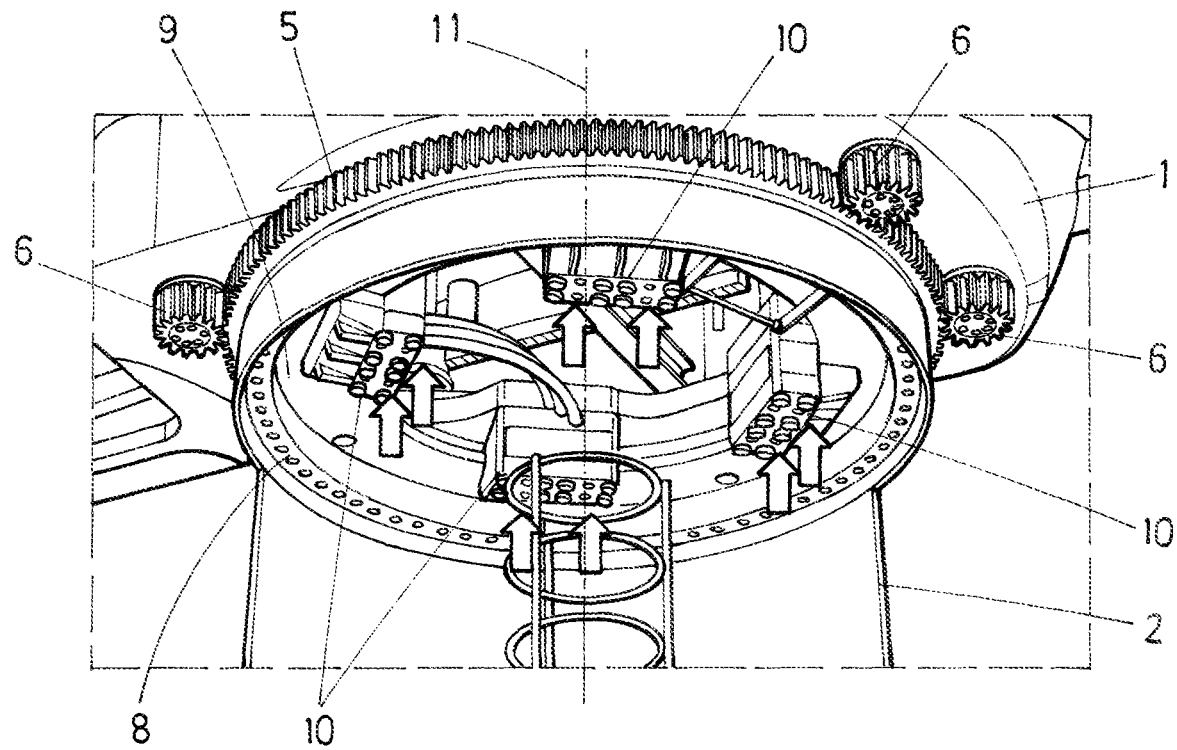

In another embodiment of the invention, the wind turbine comprises a breaking system (to stop the nacelle) that in turn comprises a brake disc (9) and at least a brake caliper (10). The brake disc (9) is located between a flange (8) formed on the top end portion of the tower (2) and the yaw bearing (3), wherein the brake disc (9) is provided with at least one brake caliper (10), preferably two, and more preferably four brakes caliper (10) distributed along the inner perimeter of the brake disc (9), as it is shown in FIG. 8A.

Figure 8C:
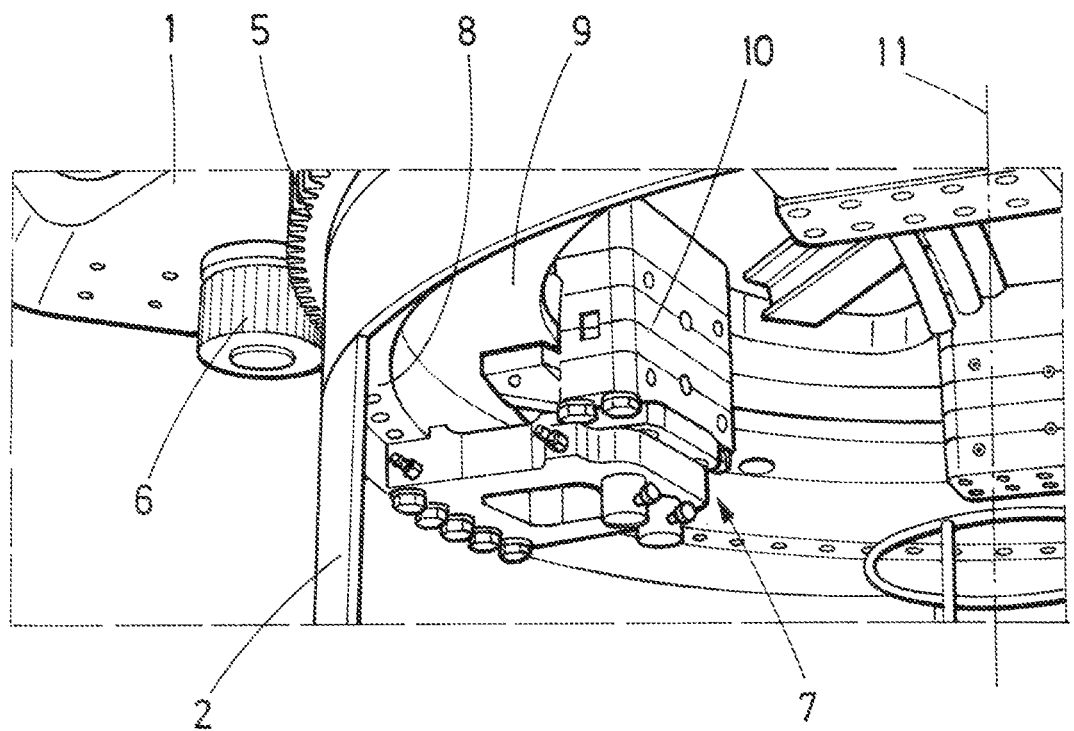
FIG. 8C shows a zoom view of an auxiliary connection element connected to a brake caliper as the ones shown in FIG. 8A or 8B.

In FIG. 8C it is shown an embodiment of the invention in which the auxiliary connection elements (7), which are distributed along the perimeter of the tower flange (8) and are located radially inside of the tower (2), use the brake calipers (10) as part of the auxiliary connection elements (7). In this case four auxiliary connection elements (7) that comprise jacks are used.

The lifting means can comprise at least one of electrical, hydraulical, pneumatical and/or mechanical means.

It is also an object of the invention a device to extend the life cycle of a wind turbine comprising a yaw system, being the device placed between a nacelle and an upper part of a wind turbine tower (2) wherein the yaw system comprises:
  a yaw bearing (3) comprising:
    a geared ring which in turn comprises a first ring (4A) connected to a geared crown (5), and
    a second ring (4B);
  at least a gear motor (6) that is fixed integrally to the nacelle or to the tower (2) and which comprises at least a pinion which mesh with the geared ring; and the device is characterized in that it comprises at least one auxiliary connection element (7) placed between the tower (2) and the nacelle frame (1) and said at least auxiliary connection element (7) provides a separation between the geared ring and a component to which the geared ring is connected, being said component the tower (2) or the nacelle frame (1).

The device placed between the nacelle and the upper part of the wind turbine tower (2) includes both, the embodiment between the nacelle and the upper part of the wind turbine tower (2) and the embodiment between the yaw bearing (3) and the upper part of the wind turbine tower (2). Preferably the device comprises two, and more preferably four auxiliary connection elements (7).

The first ring (4A) and the second ring (4B) are two movable rings which rotate one around the other and one of them is connected to the nacelle and the other is connected to the tower (2).

The invention claimed is:

1. A method to extend the life cycle of a wind turbine comprising a tower, a nacelle comprising a nacelle frame, and a yaw bearing comprising at least a geared ring for providing a rotatable connection between the nacelle and the tower around a yaw axis and at least one gear motor of a yaw drive for providing the rotatable connection between the nacelle and the tower around the yaw axis, the method comprising:
  a) disengaging the rotatable connection between the nacelle and the tower;
  b) lifting the nacelle from the tower using lifting means, allowing the rotation of the geared ring with respect to a component to which the geared ring is connectable while maintaining and powering in contact the geared ring and the at least one gear motor throughout the lifting, wherein the component to which the geared ring is connectable is either the nacelle or the tower; and c) rotating the geared ring around the yaw axis while the rotatable connection between the nacelle and the tower is disengaged, until the geared ring reaches a predetermined position with respect to the component to which the geared ring is connectable.

2. The method according to claim 1 wherein the method includes a step of determining at least a sector of the geared ring subjected to higher loads and wherein the predetermined position includes a position in which the sector subjected to higher loads is in a less loaded area.

3. The method according to claim 1, wherein the yaw bearing comprises:
the at least geared ring which in turn comprises a first ring connected to a geared crown, and
a second ring, wherein the step of disengaging the rotatable connection between the nacelle and the tower comprises disengaging a connection selected between:
a connection between the first ring and the tower while a connection between the second ring of the yaw bearing and the nacelle is maintained, or
a connection between the first ring and the nacelle while a connection between the second ring of the yaw bearing and the tower is maintained.

4. The method according to claim 1 wherein the step of lifting the nacelle from the tower is carried out by at least an auxiliary connection element placed between the nacelle and the tower, wherein the at least auxiliary connection element includes a degree of freedom to allow vertical movements of the nacelle with respect to the tower and prevents the nacelle from rotating around the yaw axis.

5. The method according to claim 3, wherein the step of lifting the nacelle from the tower comprises leaving a gap between the first ring and the component to which the first ring is connectable.

6. The method according to claim 1, wherein the method further comprising the step of lowering the nacelle by using the lifting means and connecting the nacelle to the tower through the yaw bearing.

7. The method according to claim 1 wherein the step of rotating the geared ring of the yaw bearing is done by means of activating the at least one gear motor of the yaw drive.

8. The method according to claim 7, wherein in the step of activating the at least one gear motor of the yaw drive, the at least one gear motor is fixed to the nacelle.

9. The method according to claim 7, wherein in the step of activating the at least one gear motor of the yaw drive, the at least one gear motor is fixed to the tower.

10. The method according to claim 4, wherein the at least auxiliary connection element comprises a first section to be connected to a flange formed on the top end portion of the tower, and a second section connected to the yaw bearing.

11. The method according to claim 4, wherein the at least auxiliary connection element comprises a first section to be connected to a flange formed on the top end portion of the tower, and a second section to be connected to the nacelle.

12. The method according to claim 4, wherein the wind turbine comprises a braking system that in turn comprises a brake disc and at least one brake caliper, the brake disc located between a flange formed on the top end portion of the tower and the yaw bearing.

13. The method according to claim 12, wherein the braking system comprises at least two brakes caliper.

14. The method according to claim 12 wherein the step of lifting the nacelle from the tower comprises mounting the at least one auxiliary connection element, wherein the at least auxiliary connection element comprises a first section to be connected to the flange formed on the top end portion of the tower and a second section to be connected to the at least one brake caliper.

15. The method according to claim 10, wherein the at least auxiliary connection element is distributed along a perimeter of the tower flange and is located inside of the tower.

16. A device to extend the life cycle of a wind turbine comprising a yaw system, wherein the device is placed between a nacelle and an upper part of a wind turbine tower, wherein the yaw system comprises:
a yaw bearing comprising:
a geared ring which in turn comprises a first ring connected to a geared crown, and
a second ring, and
at least a geared motor that is fixed to the nacelle or to the tower and which comprises at least a pinion which meshes with the geared ring,
wherein the device comprises at least one auxiliary connection element placed between the tower and the nacelle and said at least one auxiliary connection element is configured to provide a separation between the geared ring and a component to which the geared ring is connected while the geared ring and the at least one geared motor are maintained and powered in contact throughout the separation,
wherein the at least a geared motor is configured to rotate the geared ring around a yaw axis with respect to the component to which the geared ring is connectable, wherein the component is the tower or the nacelle.

17. The device according to claim 16 wherein the first ring and the second ring are two movable rings which rotate one around the other and one of them is connected to the nacelle and the other is connected to the tower.

18. A method for relocating the yaw bearing of a wind turbine comprising a tower, a nacelle comprising a nacelle frame, and a yaw bearing comprising at least a geared ring for providing a rotatable connection between the nacelle and the tower around a yaw axis and at least one gear motor of a yaw drive for providing the rotatable connection between the nacelle and the tower around the yaw axis, wherein the yaw bearing comprises:
the at least geared ring which in turn comprises a first ring connected to a geared crown, and
a second ring;
wherein one of the rings is connected to a nacelle frame whilst the other ring is connected to the tower;
the method comprising:
a) disengaging the rotatable connection between the nacelle and the tower while maintaining the operation of the geared ring,
b) lifting the nacelle from the tower using lifting means, allowing the rotation of the geared ring with respect to a component to which the geared ring is connectable while maintaining and powering in contact the geared ring and the at least one gear motor throughout the lifting, wherein the component to which the geared ring is connectable is either the nacelle or the tower; and;
c) rotating the geared ring which comprises the first ring around the yaw axis, with respect to the component to which the geared ring is connectable until the geared ring reaches a predetermined position with respect to the component to which the geared ring is connectable.

19. The method according to claim 18 wherein the method includes a step of determining at least a sector of the geared ring subjected to higher loads and wherein the predetermined position includes a position in which the sector subjected to higher loads is in a less loaded area.

\* \* \* \* \*